United States Patent [19]

Hauser et al.

[11] Patent Number: 5,122,378
[45] Date of Patent: Jun. 16, 1992

[54] PROCESS FOR THE PRODUCTION OF DRIED PRECOOKED PASTAS

[75] Inventors: Thomas W. Hauser; Jurg Lechthaler, both of Zurich, Switzerland

[73] Assignee: Nestec S.A., Vevey, Switzerland

[21] Appl. No.: 654,348

[22] Filed: Feb. 12, 1991

[30] Foreign Application Priority Data

Mar. 5, 1990 [CH] Switzerland ............................ 689/90

[51] Int. Cl.$^5$ .......................... A23L 1/00; A21D 6/00
[52] U.S. Cl. .................................. 426/242; 426/451; 426/458; 426/509; 426/511; 426/557
[58] Field of Search ............... 426/557, 451, 509, 458, 426/242, 243, 511

[56] References Cited

U.S. PATENT DOCUMENTS 4,973,487 11/1990 Wyss et al. ......................... 426/557

FOREIGN PATENT DOCUMENTS 59-88057 5/1984 Japan ................................... 426/557
60-40819 9/1985 Japan ................................... 426/557

Primary Examiner—George Yeung
Attorney, Agent, or Firm—Vogt & O'Donnell

[57] ABSTRACT

To prepare dried pasta, the pasta is shaped from a mixture of water and a ground cereal, the pasta thus shaped is thermally pretreated and then precooked and dried.

14 Claims, No Drawings

PROCESS FOR THE PRODUCTION OF DRIED PRECOOKED PASTAS

BACKGROUND OF THE INVENTION

This invention relates to a process for the preparation of dried pastas such as, for example, quick-cooking pastas or instant pastas.

Various processes have been described for the preparation of pastas having a reduced cooking time, for example of a few minutes in a microwave oven, or pastas which can be rapidly reconstituted for eating, for example by immersion in hot water or a hot stock.

One of these processes comprises extruding the pastas in the required shape, precooking them for a few minutes in boiling water and then draining and drying them. However, it has been found that significant losses of material can occur during the precooking step.

SUMMARY OF THE INVENTION

The object of the present invention is to provide a process for the preparation of dried pastas in which the losses of starting material are reduced.

In the process for the preparation of dried pastas according to the invention, a mixture of water and a ground cereal is prepared and shaped into a pasta, the shaped pasta is thermally pretreated, the thermally pretreated pasta is precooked in boiling water and the precooked pasta is dried.

The shaped pasta is pre-treated thermally, that is, heated, prior to introducing the shaped pasta into water to precook the shaped pasta, to reduce or even eliminate the interval of temperature between the temperature of the shaped pasta and the temperature of the precooking water which, it has surprisingly been found, enables the losses of starting material occurring during the precooking of the pasta to be considerably reduced.

Another advantage of this process is that the dried pasta obtained has an improved quality and texture.

DETAILED DESCRIPTION OF THE INVENTION

To carry out the process according to the invention, a mixture consisting of a ground cereal product and water is prepared. The ground cereal product may be, for example, flour and/or semolina obtained by grinding grains of cereals, such as hard wheat, soft wheat, rice or corn. Such additives as fresh or dehydrated eggs, salt, spices, flavourings or emulsifiers may be added to the mixture. Water may be added in a quantity sufficient to obtain a mixture having a dry matter content of the order of 60 to 75% by weight.

The mixture then is shaped, for example by extrusion of the mixture in a screw extruder or a rotating-bar extruder or by rolling, followed by cutting to give the pasta the required shape and size.

The pasta thus shaped is then be thermally pretreated.

The thermal pretreatment may be carried out, for example, by heating for 5-150 seconds to 80°-14 200° C. using a stream hot air flowing, for example, at 15-30 $ms^{-1}$.

The thermal pretreatment may also be carried out, for example, by application of microwave energy, for example at a level of 400 to 1,300 W, for 50 to 500 seconds.

The thermal pretreatment may also be carried out with a stream of steam or with infrared radiation.

The conditions with particular regard to time, temperature and power output level under which the thermal pretreatment is carried out may be selected by the person skilled in the art in dependence inter alia upon the shape and size of the pasta to be pretreated and the difference between the temperature of the pasta issuing from the extruder or roller and the temperature of the water used for precooking.

It has been found that significant losses of starting material can occur during the precooking step. Now, these losses may possibly be attributable to an excessive difference between the temperature of the pasta issuing from the extruder or roller and the temperature of the precooking water.

The pasta issuing from an extruder or roller may be at a temperature, for example 30° to 45° C., below the temperature of the water used for precooking, for example 97° to 100° C. When the pasta is introduced into the precooking water, the heat supplied by the water may be used first to heat the pasta to a suitable temperature for precooking, for example 97° to 100° C., and thereafter solely to precook the pasta.

The result of this is that precooking does not start immediately after introduction of the pasta into the precooking water. Now, it has been found that losses of material of the order 9 to 15% by weight can occur when precooking is carried out at a temperature below 97° to 100° C. and/or when precooking does not begin immediately after introduction of the pasta into the precooking water.

It has been found that precooking which begins immediately at a temperature of at least 97° C. enables both the structure of the pasta to be stabilized, by denaturing the proteins present at its surface, and a high-quality pasta having an improved structure and texture to be obtained while at the same time reducing the losses of starting material.

Accordingly, the thermal pretreatment enables the interval between the temperature of the pasta issuing from the extruder or roller and the temperature of the precooking water to be reduced or even eliminated so that precooking begins rapidly or even immediately at a temperature of at least 97° C.

The pasta thus pretreated may then be precooked in boiling water. In particular, the pasta may be precooked for 1 to 5 minutes in slightly acidified water having a pH of 5 to 6 and a temperature of 97° to 100° C.

The precooked pasta may then be dried, for example in a hot-air dryer at 80° to 90° C., by infrared radiation or by microwaves, over a period of about 1 to 8 hours so that dried pasta having a dry matter content of 92 to 98% by weight is obtained.

The process according to the invention for the production of dried pasta may be carried out discontinuously, semicontinuously or, preferably, continuously.

To carry out the process according to the invention continuously, pasta issuing from and extruder or roller may be deposited onto a conveyor belt, for example in a layer having a thickness of several centimeters. The belt carrying the pasta may then be passed through a heating tunnel, more particularly a hot air tunnel, in which hot air at 80° to 200° C. for example is introduced from about the belt, passes vertically downwards through the belt and the pasta and is recovered by a fan situated beneath the belt. The pasta thus pretreated may then be continuously precooked and dried.

EXAMPLES

The invention is illustrated in more detail by the following Examples.

EXAMPLE 1

A mixture containing 15 parts by weight hard wheat semolina and 4.7 parts by weight water is prepared. The mixture is extruded in a screw extruder and then cut to obtain pasta of the cornet type having a diameter of approximately 5 mm and a wall thickness of approximately 1.5 mm.

For thermal pretreatment, the pasta is arranged on a conveyor belt in the form of an approximately 2 to 4 cm thick layer. The belt is then passed at a speed of approximately 0.1–0.2 ms$^{-1}$ through a hot-air tunnel 90 cm long and 20 cm wide of the type described above. Pretreated pasta is thus obtained at an output of 40 to 130 kg per hour.

The pretreatment temperature and the rate at which the hot air passes downwards through the layer of pasta are varied as shown in the following Table. The pasta is then cooked for 3 minutes in boiling water at 98°–100° C./pH 5.5. The precooked pasta is drained and then dried for about 5 hours at 85° C. to a dry matter content of 96% by weight.

Pasta samples corresponding to the various pretreatment conditions are taken. The losses of material occurring during the precooking step are measured in % by weight. The results obtained are shown in the following Table which, for comparison, also shows the losses of starting material occurring during the precooking of a control sample prepared in the same way, but without the thermal pretreatment, and also the difference between the losses measured on the control sample and the losses measured on the pasta samples which have been thermally pretreated.

| Example | Thermal pretreatment | | | Losses (%) | Difference (%) |
|---|---|---|---|---|---|
| | Time (s) | Temperature (°C.) | Air flow rate (m/s) | | |
| Control | — | — | — | 10.03 | — |
| A | 9.4 | 190 | 20 | 8.25 | 17.8 |
| B | 7.6 | 190 | 25 | 7.80 | 22.3 |
| C | 17.3 | 130 | 25 | 6.88 | 31.4 |
| D | 30.0 | 135 | 29 | 6.47 | 35.5 |
| E | 35.0 | 148 | 21 | 6.47 | 35.5 |

It can be seen that the thermal pretreatment enables the losses of starting material to be reduced by at least 17.8%. This saving can be increased to 35.5% by a longer pretreatment time. It can also be seen that the best results are obtained by a relatively long pretreatment carried out at a relatively low temperature (30–35 seconds, 135°–148° C.).

EXAMPLE 2

A mixture of 80 parts by weight hard wheat semolina, 10 parts by weight pasteurized whole eggs and 1 part by weight emulsifier is prepared and water is then added to obtain a dry matter content of approximately 69% by weight.

The mixture is extruded in a screw extruder and the material is cut into pasta of the cornet type approximately 5 mm in diameter for a length of approximately 70 mm and a wall thickness of approximately 0.9 mm.

For thermal pretreatment, the pasta are arranged on a conveyor belt in the form of a layer approximately 2 to 4 cm thick. The conveyor belt is passed at a speed of approx. 0.1 to 0.2 ms through a microwave tunnel equipped with a magnetron of which the power output is variable between 0 and 3 kW. The power level and the pretreatment time are selected so as not to affect the visual appearance of the pasta (through the formation of surface bubbles) while ensuring optimum thermal pretreatment.

The pretreated pasta is then precooked in boiling water for 2.5 minutes at 98° to 100° C. and at pH 5.5.

The precooked pasta is drained and then dried for about 5 hours at 85° C. to a dry matter content of 96% by weight.

Samples of the pasta corresponding to different pretreatment conditions are taken. The losses of starting material during the precooking step are measured in % by weight.

The results obtained are set out in the following Table which, for comparison, also shows the losses of starting material in the precooking of a control sample prepared in the same way, tut without thermal pretreatment, and the difference between the losses measured on the control sample and those measured on the pasta samples which have been thermally pretreated.

| Sample | Thermal pretreatment | | Losses % | Difference % |
|---|---|---|---|---|
| | Duration (s) | Power (W) | | |
| Control | — | — | 9.50 | — |
| A | 71 | 1,300 | 8.17 | 14 |
| B | 150 | 1,300 | 7.65 | 19.5 |
| C | 262 | 400 | 8.55 | 10 |

The thermal pretreatment by microwaves thus enables the losses of starting material to be effectively reduced. In addition, texture analyses of the samples thus prepared show that:

samples A and B and, to a lesser extent, sample C have a firmer texture than the control sample, samples A, B and C have a less sticky texture than the control sample.

Accordingly, the pretreatment according to the invention also enables the texture of the pasta obtained to be improved. The microwave pretreatment provides for coagulation and for rapid fixing of the gluten. Accordingly, it is possible to use a ground cereal of low gluten content (approximately 11% for example) as such with no need to add a binder.

We claim:

1. A process for preparing a dried, pre-cooked pasta comprising preparing a pasta mixture of water and a ground cereal, shaping the mixture into a shaped pasta, heating the shaped pasta for a time to increase a temperature of the shaped pasta to at least reduce an interval of temperature between a temperature of the shaped pasta and a temperature of water heated to a temperature suitable to precook pasta, introducing the heated temperature increased shaped pasta into the heated water and precooking the heated, shaped pasta in the heated water and then drying the precooked pasta.

2. A process according to claim 1 wherein the shaped pasta is heated for from 5 seconds to 150 seconds with a stream of hot air at a temperature of from 80° C. to 200° C. flowing at a rate of from 150 m/s to 30 m/s.

3. A process according to claim 1 wherein the shaped pasta is heated to a temperature of at least 97° C. prior to precooking.

4. A process according to claim 1 wherein the heated shaped pasta is precooked for from 1 minute to 5 minutes at a temperature of from 97° C. to 100° C. in water having a pH of from 5 to 6 and wherein the precooked pasta is dried to a dry matter content of from 92% by weight to 98% by weight.

5. A process according to claim 1 wherein the precooked pasta is dried by infrared radiation.

6. A process according to claim 1 wherein the precooked pasta is dried by microwave radiation.

7. A process according to claim 1 wherein the precooked pasta is dried in a hot air dryer at a temperature of from 80° C. to 90° C.

8. A process according to claim 1 wherein the shaped pasta is heated with microwave energy.

9. A process according to claim 8 wherein the microwave energy is at a level of from 400 W to 1,300 W, and the shaped pasta is heated for from 50 seconds to 500 seconds.

10. A process according to claim 1 wherein the shaped pasta is heated with infrared radiation.

11. A process according to claim 1 wherein the shaped pasta is heated with a stream of steam.

12. A process according to claim 1 wherein the shaped pasta is heated to at least the temperature of the heated water.

13. A process according to claim 3 wherein the shaped pasta is heated to a temperature of from 97° C. to 100° C.

14. A process according to claim 4 wherein the shaped pasta is heated to a temperature of from 97° C. to 100° C.

* * * * *